Jan. 31, 1950

H. H. HAGENS 2,496,159

TELEPHONE SYSTEM

Filed Dec. 5, 1947

INVENTOR
H.H.HAGENS
BY
G. F. Kane
ATTORNEY

Patented Jan. 31, 1950

2,496,159

UNITED STATES PATENT OFFICE 2,496,159

TELEPHONE SYSTEM

Herbert H. Hagens, Madison, N. J., assignor to Bell Telephone Laboratories, Incorporated, New York, N. Y., a corporation of New York Application December 5, 1947, Serial No. 789,817

7 Claims. (Cl. 179—37)

Figures 1, 2:
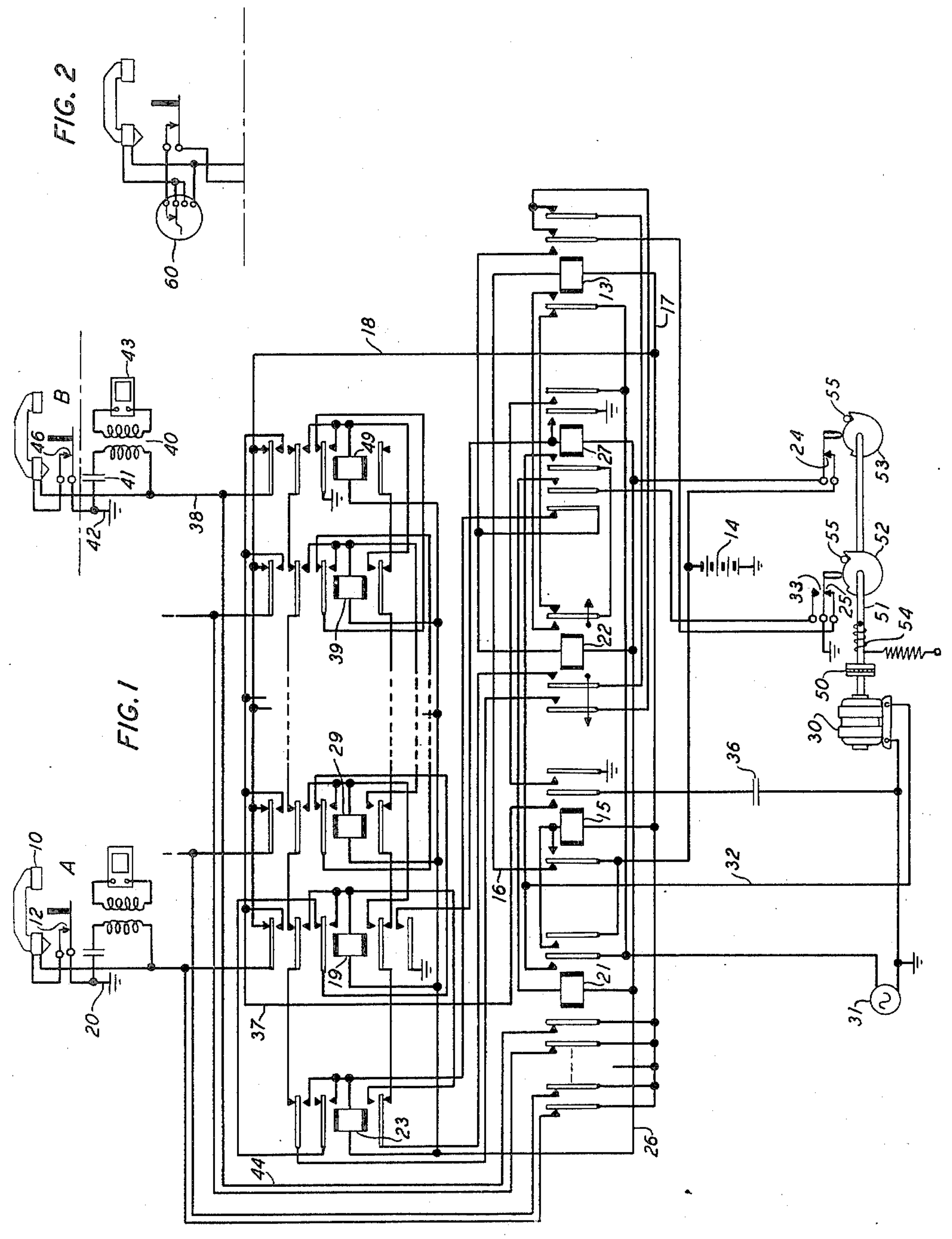

This invention relates to telephone systems and particularly to small capacity intercommunicating systems.

It is the object of this invention to provide a simplified and otherwise improved intercommunicating system of the type in which the completion of interstation connections is controlled through the medium of a subscriber-actuated pulsing mechanism.

In accordance with a feature of the invention the conventional dial, or pulsing device may be omitted from the telephone substation and the telephone switchhook employed in its stead to effect the transmission of station-identifying signals.

In accordance with a further feature of the invention a time measuring device functions a predetermined interval of time after the transmission of the last impulse of a series of impulses, characterizing a station designation, to cause the signaling of a called station and the connection of talking battery to both a calling and a called station.

Another feature of the invention limits the signaling of a called station to a predetermined time interval.

A still further feature of the invention precludes the possibility of signaling incident to a false origination and abandonment of a call.

Still another feature of the invention contemplates the use of but two conductors per telephone station over which both call and speech signals are transmitted.

Another feature of the invention resides in the combination of a relay chain circuit and timing means which render it possible for telephone connections to be completed under the control of station-designating impulses transmitted at variable time spaced intervals. More particularly, a relay chain circuit is employed to count the pulses transmitted over a circuit including contacts controlled by a time measuring device which maintains the pulsing circuit intact for a predetermined time interval unless the same is interrupted by the transmission of an impulse before the termination of the said time interval. Thus, if the said time interval is assumed to be five seconds, the system of this invention will function to set up telephone connections on impulses generated at a calling station at regular, or irregular intervals ranging from one-tenth second (speed of dial pulsing) to five seconds.

These and other features of the invention will be readily understood from the following detailed description when read with reference to the accompanying drawing in which:

Fig. 1 is a circuit diagram of a ten station inter-communicating system involving the features of the invention and showing, in detail, two substation circuits arranged for switchhook pulsing, and Fig. 2 is a diagram of a substation circuit involving a conventional dial.

Before entering into a detailed description of the operation of the system disclosed in the drawing a brief reference will be made to the time measuring device which is schematically illustrated at the lower portion of Fig. 1. This device, which may take forms other than the one illustrated, comprises essentially a slow speed synchronous motor 30 which drives a shaft 51 through a friction clutch of any suitable design. The shaft 51 carries two cams 52 and 53 each of which controls a set of spring contacts. A restoring spring 54 is shown wound on the shaft 51 and functions to restore the shaft to its normal illustrated position whenever the clutch 50 is disengaged. The stops 55 determine the normal position of the shaft 51. When power is applied to the motor 30 the elements of the clutch 50 automatically engage each other and the shaft 51 rotates with the motor armature. Cam 52 which is fixed to the shaft 51 is so designed as to cause its cam follower to disengage spring contact 25 and to engage spring contact 33 after the cam has been rotating for five seconds. Similarly, the cam 53 which is also fixed to the shaft 51 is so designed as to cause its follower to disengage the spring contact 24 after the cam has been rotating for eleven seconds. Should the power supplying the motor 30 be interrupted at any time the clutch 50 automatically releases the shaft 51 which then returns to normal position under the influence of the coil spring 52. The circuits controlled by the contacts 24, 25 and 33 will appear from the description of the operation of the system which will be made presently.

Cooperating with the timer described above is a relay counting circuit comprising relays 19, 20—39, 49, each of which corresponds to a particular one of a plurality of subscriber's stations. These relays operate in chain fashion, each preparing an operating circuit for the next relay in the chain, and locking under the control thereof. The timer furnishes ground for operating the counting relays sequentially and this ground is maintained available after the transmission of each pulse for a predetermined time interval (5 seconds), so that the counting circuit will function to count pulses originated at a calling station incident to the actuation of the switchhook contacts thereat just so long as the time between pulses does not exceed the predetermined interval. When a period of 5 seconds elapses after the transmission of a pulse counting ceases and the circuit functions to signal the called station and to otherwise complete a communication connection between the calling and called stations.

In the following description it will be assumed that the party at station A desires to communicate with the party at station B and proceeds to set up a connection between the two stations by removing the telephone handset 10 from its support in the usual manner and by operating the switchhook contacts 12 in accordance with the telephone designation of the called station B. It will be assumed further that the numerical designation of the called station B is "10" and that, therefore, the switchhook contacts 12 are actuated ten times at the station A.

When the telephone handset 10 is removed from its support the switchhook contacts 12 are closed in the well-known manner, whereupon relay 13 operates in a circuit which includes grounded battery 14, left armature and back contact of relay 15, conductor 16, winding of relay 13, conductor 17, conductor 18, back contact and outermost upper armature of relay 19, the telephone instrument 10, closed switchhook contacts 12 at station A to ground on the tip conductor 20. It will be noted at this time that a parallel path from conductor 17 to ground on the tip conductor 20 of the calling station A includes the outermost left armature and back contact of relay 21. The purpose of this branch circuit will appear as the description progresses.

With relay 13 operated, relay 23 and slow release relay 22 operate. The operating circuit for relay 22 includes the grounded battery 14, timer contact 24, winding of relay 22, front contact and inner right armature of relay 13, timer contact 25 and ground. Relay 23 operates in a circuit extending from grounded battery 14, timer contact 24, conductor 26, winding of relay 23, back contact and outermost left armature of relay 27, front contact and inner right armature of relay 13, timer contact 25, to ground.

Relay 23, operated, locks by way of its front contact and inner upper armature, the back contacts and innermost upper armatures of all individual station relays 19, 29, etc., 39 and 49 of the pulse counting circuit to ground.

When the switchhook, or button is operated, or flashed at the calling station A to cause the actuation of the switchhook contacts 12 ten times in accordance with the call number, or designation, of the called station B, ground pulses are sent from the timer contact 25 to the relay counting circuit in the following manner, it being understood that relay 13 restores its armatures on each opening of the switchhook contacts 12 at station A. With relay 13 released because of the opening of contacts 12 ground is extended over the timer contact 25, inner and outer right armatures and back contacts of relay 13, inner left armature and front contact of relay 22, lower armature and front contact of relay 23, winding of relay 19, conductor 26, timer contact 24, to grounded battery 14. Thus, the first pulse transmitted incident to the flashing of the switchhook contacts 12 operates relay 19 of the relay counting circuit. It will be recalled that when relay 23 operated it locked in a circuit which included the back contact and innermost upper armature of relay 19. Now with relay 19 operated, as described, this circuit is opened. Relay 23, however, remains locked during pulsing over a substitute circuit which includes the front contact and outer upper armature of relay 23, front contact and outer left armature of relay 22, back contact and inner right armature of relay 13, timer contact 25, and ground.

Relay 19, operated, locks by way of its front contact and innermost upper armature to ground by way of corresponding armatures and back contacts of the remaining counting relays 29—39 and 49.

At the end of the first pulse the switchhook contacts 12 are closed and relay 13 reoperates thus releasing relay 23 and restoring the circuit to the condition it was in just prior to the first flashing operation of the contacts 12 at station A except that relay 19 is now operated and locked.

The second pulse incident to the next opening of switchhook contacts 12 and the consequent release of relay 13 causes the second relay 29 of the counting circuit to operate in a circuit extending from grounded battery 14, timer contact 24, conductor 26, winding of counting relay 29, front contact and inner lower armature of counting relay 19, back contact and lower armature of relay 23 (it being understood that relay 23 releases with relay 13 coming up again), front contact and inner left armature of relay 22, back contacts and right armatures of relay 13, to ground by way of the timer contact 25. Relay 29 operated, locks as did relay 19 previously described, and opens the locking circuit for relay 19 which releases after relay 13 comes up again. Thus relay 29 of the counting circuit is operated and locked as a result of the second ground pulse caused by the flashing of the switchhook contacts 12 at station A.

All the remaining relays of the counting circuit operate sequentially in a similar manner as the flashing of the contacts 12 is continued until the tenth relay 49 operates and locks incident to the transmission of the tenth pulse of the code which is allocated to the called station B.

When relay 19, or the first of the counting relays operated, as described, relay 27 was caused to operate in a circuit extending from grounded battery 14, timer contact 24, winding of relay 27, outer lower armature and front contact of relay 19 to ground. Relay 27 locks operated by way of its front contact and inner right armature to ground thus placing it directly under control of the timer contact 24.

With relays 13, 22 and 27 operated, a circuit closure to the timer motor 30 is completed. This circuit may be traced from the lower grounded terminal of the local alternating current source 31, through the motor 30, conductor 32, front contact and innermost left armature of relay 27, right armature and front contact of relay 22, front contact and left armature of relay 13, to the upper terminal of current source 31. This circuit is interrupted, on every pulse, at the left armature front contact of relay 13 so that while the motor 31 is started operating upon the operation of relay 19, that is, upon the transmission of the first code signal pulse, it is deenergized during each pulse and the timer shaft 51 restores to normal under the action of spring 54, so that unless the interval between pulses exceeds a predetermined time (5 seconds), the timer contact 25 is not opened nor the timer contact 33 closed during the pulsing period. After pulsing has been completed the motor 30 will continue to function and after a period of 5 seconds will cause the timer contact 25 to be opened and contact 33 to be closed. Opening of contact 25 removes ground from the pulsing lead. Closure of contact 33 causes relay 21 to operate in a circuit which may be traced from grounded battery 14, timer contact 24, winding of relay 21, front contact and middle left armature of relay 27, timer contact 33 to ground.

Relay 15 now operates in a circuit which may be traced from grounded battery 14, outer right armature and front contact of relay 21, winding of relay 15, conductor 18, back contact and outermost upper armature of relay 19, telephone 10, closed switchhook contacts 12 at the calling station A to ground on the tip conductor 20. Obviously, had the call been abandoned at station A causing the opening of contacts 12, relay 15 would not operate.

With relay 15 operated and locked independent of relay 21, the alternating current source 31 is connected to the called station to cause the operation of the audible signaling device 43 thereat. The signaling circuit may be traced from the grounded terminal of the source 31, condenser 36, inner right armature and front contact of relay 15, conductor 37, front contact and outermost upper armature of counting relay 49, ring conductor 38, primary winding of transformer 40, condenser 41 to ground on the tip conductor 42. The audible signal 43 in the nature of a buzzer is bridged across the secondary winding of transformer 40 and responds to the current induced therein. Buzzer 43 operates as a call signal and will remain operating for a period of six seconds whether or not the party at station B answers. After a period of six seconds (that is, eleven seconds from the beginning of the operation of motor 31) the timer contact 24 is opened causing relay 49, and all other operated relays excepting relay 15, to release. Relay 49 in restoring its outermost upper armature opens the circuit to transformer 40 causing the silencing of the buzzer 43. It will be observed that the buzzer signal at the calling station A is not influenced by the signaling current since its signaling path is open at the outermost upper front contact of relay 19.

Relay 15, operated, connects battery 14 to the established connection for talking purposes. The talking battery circuit to the calling station A may be traced from grounded battery 14, left armature and front contact and winding of relay 15, conductor 18, back contact and outermost upper armature of relay 19, telephone 10 at station A, contacts 12 thereat to ground on the tip conductor 20. The talking battery circuit to the called station B may be traced from grounded battery 14 through the winding of relay 15 by way of the circuit just traced, thence over the innermost left armature and back contact of relay 21, conductor 44, ring conductor 38, telephone 45 at station B, switchhook contacts 46 thereat to ground on the tip conductor 42. It will be observed that relay 15 is thus held operated under control of both the called and the calling stations so that it will remain operated until both parties have replaced their telephones on their respective supports. When this occurs the circuit is restored to normal and is made ready for the next call.

Should the calling subscriber, having made a false start, abandon a call before it is answered, relay 27 will be operated, as described, and a path to the timer motor 30 completed over back contacts of relays 13 and 22. Relay 22 is slow in releasing and releases after a time interval so that in this case of a false start it releases a predetermined interval after relay 13 releases. The timer will then go through a complete cycle involving the operations set forth above except that relay 15 will not operate and no ringing current will be sent out on the line. An interval of eleven seconds (duration of a cycle) must be maintained before another call can be originated.

The substation of Fig. 2 distinguishes from the substations of Fig. 1 only in the showing of a dial. It is to be understood that the conventional type of dial may be employed in the system of this invention if desired. The circuits illustrated will respond equally well to the precisely timed interruptions of the pulsing circuit caused by the conventional dial as they do on switchhook flashes.

What is claimed is:

1. In a telephone system, telephone stations having switchhook-controlled contacts thereat, means responsive to the operation of said contacts at one of said stations in accordance with a particular code for preparing a signaling circuit to another of said stations, and time measuring means for delaying the completion of the signaling circuit for a predetermined interval of time following the operation of said contacts in accordance with the said code.

2. In a telephone system, telephone stations having switchhook-controlled contacts thereat, means responsive to the operation of said contacts at one of said stations in accordance with a particular code for preparing a signaling circuit to another of said stations, time measuring means, means controlled by said time measuring means for completing said signaling circuit a predetermined interval of time following the operation of said contacts in accordance with the said code, and other means controlled by said time measuring means for interrupting said signaling circuit a predetermined interval of time after its completion.

3. In a telephone system, telephone stations having switchhook-controlled contacts thereat for transmitting variably spaced impulses, means selectively responsive to the transmission of a predetermined number of impulses from one of said stations for selecting another of said stations for a signaling operation, and means for completing the signaling operation to the selected station a predetermined interval of time after the transmission of the last of the predetermined number of impulses.

4. In a telephone system, telephone stations each having impulse transmitting means thereat capable of manual operation to transmit station-selecting impulses spaced at irregular intervals, and means responsive to the operation of the impulse transmitting means at one of said stations for completing a signaling circuit to another of said stations only when the interval following a transmitted impulse exceeds a predetermined duration.

5. In a telephone system, telephone stations each having impulse transmitting means thereat capable of manual operation at variably spaced intervals to effect the transmission of correspondingly spaced station-selecting impulses, means for counting impulses transmitted incident to the operation of the impulse transmitting means at one of said stations in accordance with a particular code so long as the intervals between successive operations of said impulse transmitting means do not exceed a predetermined time duration, and means including said counting means for completing a signaling circuit to another of said stations only when the operation of the impulse transmitting means at the said one station in accordance with the said particular code is followed by an interval which exceeds the said predetermined time duration.

6. The combination in a telephone system of calling and called stations, an impulse receiving circuit, means at a calling station for transmitting variably time spaced impulses to said impulse receiving circuit to select a called station, and time measuring means for limiting the spacing between called station-selecting impulses to a predetermined maximum interval.

7. In a telephone system in which telephone connections between calling and called stations are completed under the control of successive time spaced impulses transmitted from a calling station, means responsive to the successive transmission of impulses from a calling station at spaced intervals of predetermined maximum time durations for completing a connection to a called station, and means for completing a signaling circuit to the called station only when an interval exceeding the predetermined maximum time duration follows the transmission of an impulse.

HERBERT H. HAGENS.

REFERENCES CITED

The following references are of record in the file of this patent:

UNITED STATES PATENTS

| Number | Name | Date |
|---|---|---|
| 1,107,135 | Clement | Aug. 11, 1914 |
| 1,738,564 | Christian | Dec. 10, 1929 |
| 2,225,907 | Duguid et al. | Dec. 24, 1940 |